United States Patent [19]

Cain

[11] Patent Number: 4,608,166

[45] Date of Patent: Aug. 26, 1986

[54] PRESS FIT FILTER

[75] Inventor: Thomas A. Cain, Woodstock, Ill.

[73] Assignee: Filtertek, Inc., Hebron, Ill.

[21] Appl. No.: 718,726

[22] Filed: Apr. 1, 1985

[51] Int. Cl.[4] .............................................. B01D 25/02
[52] U.S. Cl. ................................... 210/232; 210/435;
210/452; 210/500.1; 210/541; 210/542;
228/903; 264/DIG. 48
[58] Field of Search ............... 228/903; 264/DIG. 48;
210/348, 500.1, 483, 232, 441, 442, 448, 452,
435, 459, 460, 541, 542

[56] References Cited

U.S. PATENT DOCUMENTS 3,900,649 8/1975 Hart et al. .......................... 228/903

Primary Examiner—Frank Sever
Attorney, Agent, or Firm—Willian Brinks Olds Hofer Gilson & Lione Ltd.

[57] ABSTRACT

A filter suitable for press fitting into an assembly for inline filtration is disclosed. The filter includes a base, filtration material supported on the base, and a metal collar surrounding at least a portion of the base with a portion of the metal collar embedded in the base. The leading edge of the collar and anchor tabs on the distal end of the collar are embedded in the base and thus secure the collar to the base. The collar also has a rounded entry corner which provides a smooth entry into the press fit hole when the filter is pressed into place.

16 Claims, 7 Drawing Figures

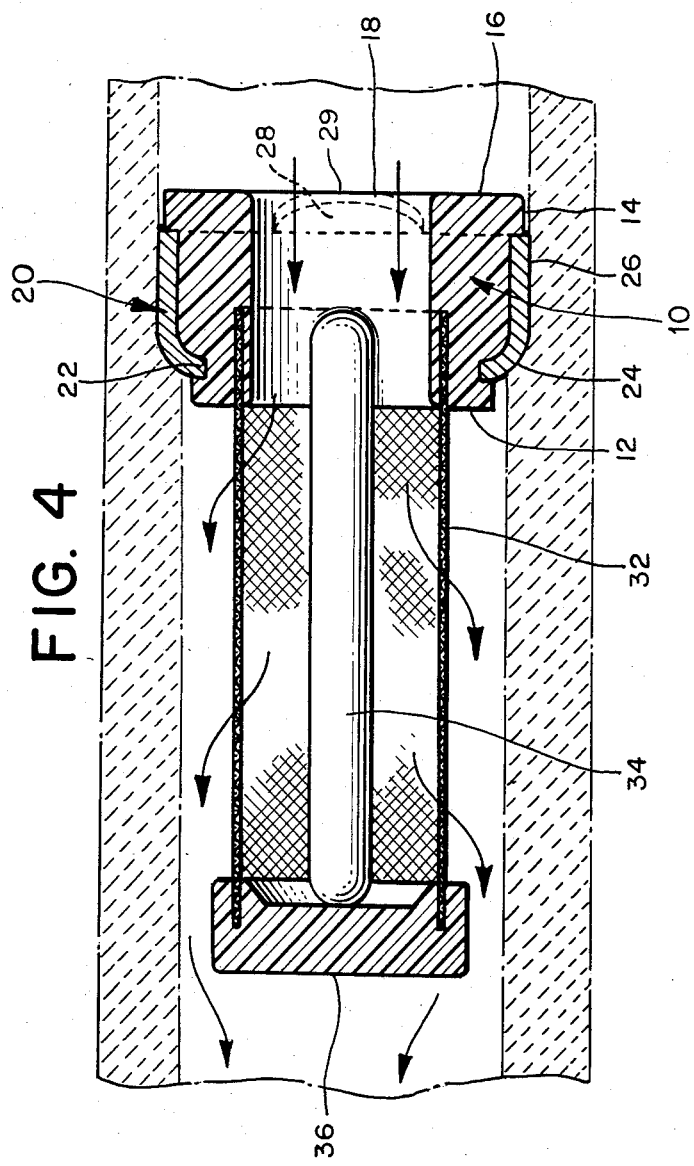
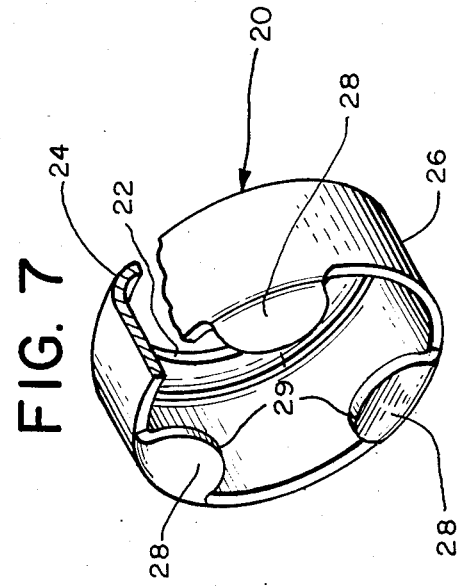
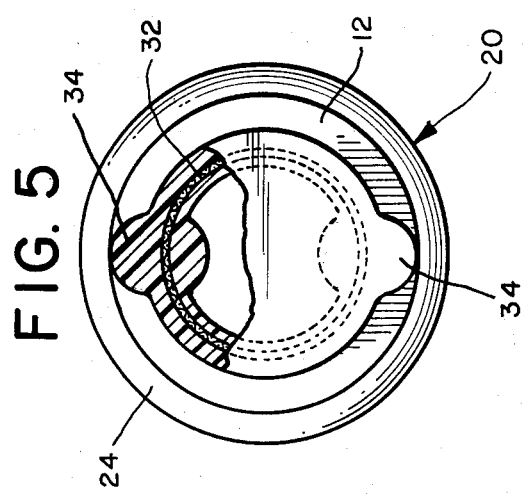
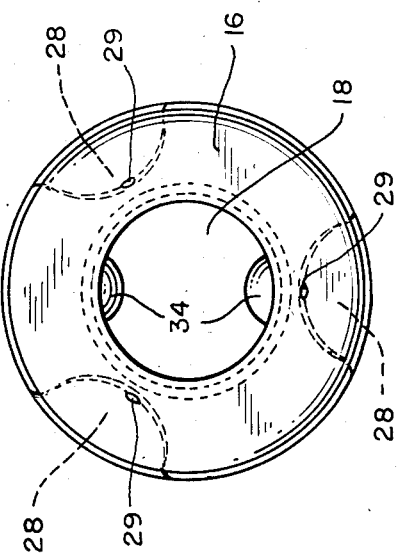

PRESS FIT FILTER

BACKGROUND OF THE INVENTION

This invention relates to filters in general and particularly to press fit filters.

Often it is desirable to put a filter into an assembly to filter fluids passing through the assembly. One example is a filter in a fuel injector assembly to protect the injector orifices from plugging.

There are several methods of incorporating the filter into the assembly. A simple method is to make a shoulder in the path flow through the assembly and provide the filter with a supporting base which butts up against the shoulder when the filter is placed in the assembly. The base may be held in place against the shoulder by different methods. One method is to size the base so that it can be press fit into the enlarged area in front of the shoulder.

One difficulty with a press fit filter is that the coefficient of expansion of the material used in the filter base and the assembly must be close enough so that expected temperature changes in the assembly will not affect the press fit. For example, a filter with a plastic base in a metal fitment hole may become loose as the assembly temperature increases and the metal expands more than the plastic.

One way to overcome the coefficient of expansion differences when plastic base filters are used in metal assemblies is to surround the base with a metal collar. Then, however, the collar and the plastic tend to slip apart as the collar expands during heating. In addition, when the filter is press fit into the assembly, the leading edge of the collar may shear particles from the wall of the press fit hole. These particles are then down stream from the protecting filter.

SUMMARY OF THE INVENTION

This invention relates to a filter suitable for press fitting into a fitment hole which includes filtration material supported on a base and a metal collar surrounding at least a portion of the base. A portion of the collar is embedded in the base. Further aspects of the invention include a rounded surface on the entry corner of the collar.

With a portion of the collar being embedded in the base, the collar is secured to the base so that the collar and base do not slip apart if the filter and assembly are subject to a temperature change. The rounded entry corner of the collar provides a smooth metal surface in contact with the entrance corner and walls of the fitment hole, preventing the shearing of particles from the wall during assembly.

BRIEF DESCRIPTION OF THE DRAWINGS

FIG. 4 is a sectional view taken along line 4—4 of FIG. 2 showing the filter of FIG. 1 in place in an assembly.

FIG. 5 is a partial sectional view taken along line 5—5 of FIG. 2.

FIG. 6 is an end view taken along line 6—6 of FIG. 2.

FIG. 7 is a perspective view of the collar on the filter of FIG. 1.

DETAILED DESCRIPTION OF THE PREFERRED EMBODIMENTS OF THE INVENTION

Figure 1:
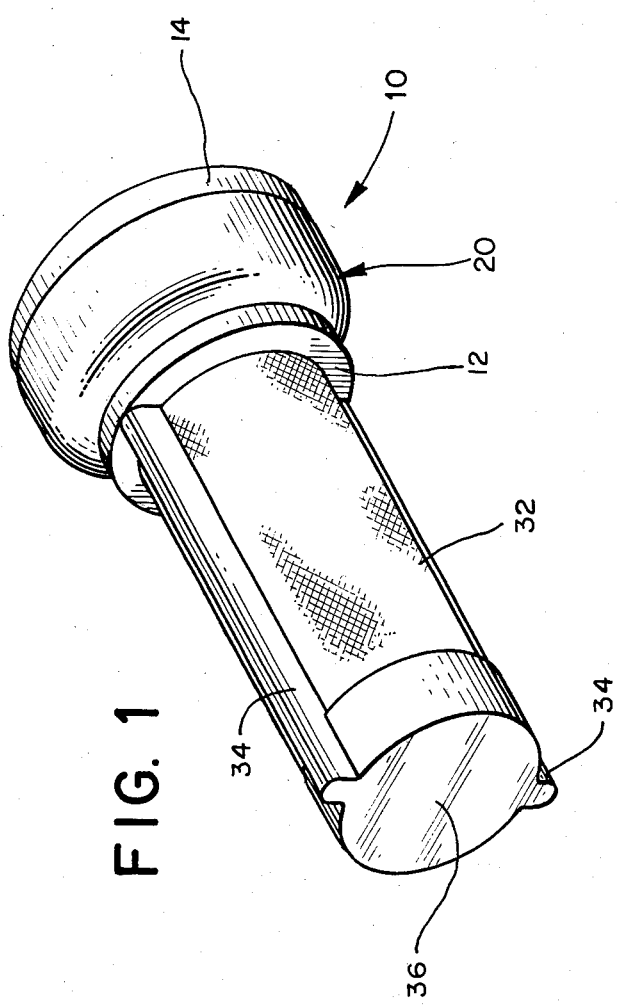
FIG. 1 is a perspective view of a preferred embodiment of the press fit filter of the present invention.

A filter suitable for press fitting into a fitment hole is shown in FIG. 1. The filter is comprised of a plastic base 10 and ribs 34 supporting filtration material 32. The support ribs 34 also connect with an end wall 36 at the end of the filter opposite the base 10 which helps hold the filtration material 32 in a cylindrical shape. A hole 18 through the base 10 (best shown in FIG. 6) allows fluid to enter the filter.

Figure 2:
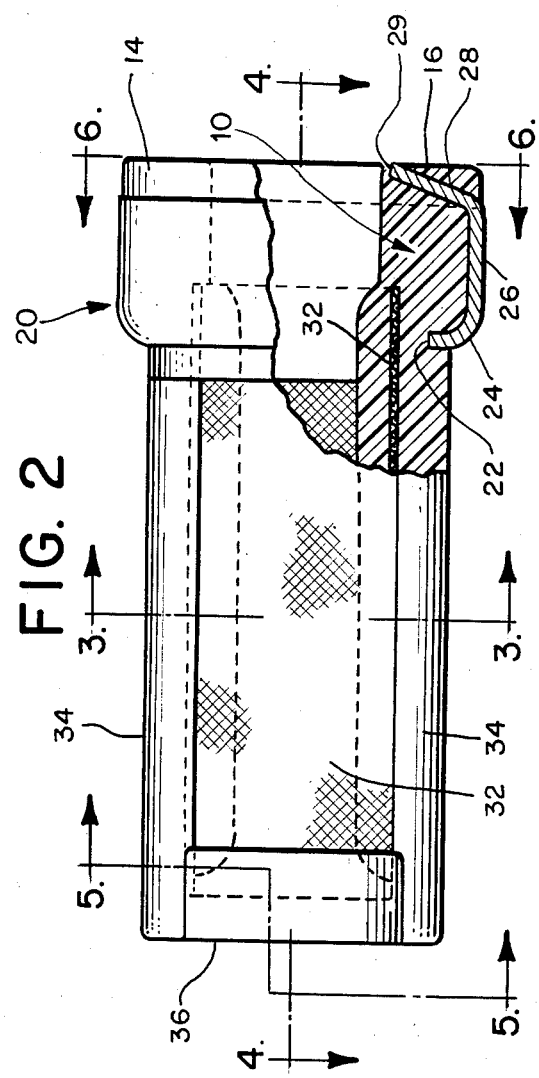
FIG. 2 is a partial sectional side view of the filter of FIG. 1.
Figure 3:
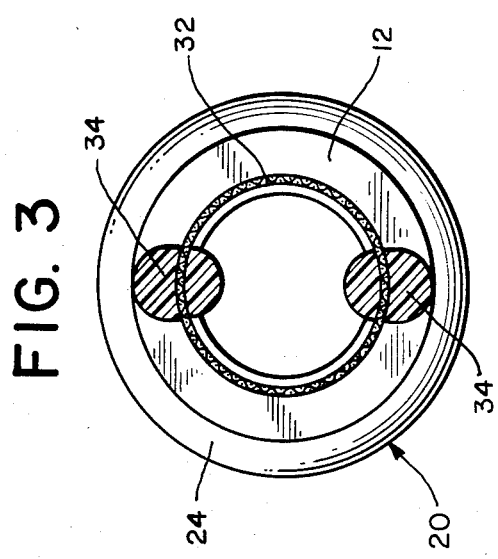
FIG. 3 is a sectional view taken along line 3—3 of FIG. 2.

Surrounding a portion of the base 10 is a collar 20, shown in detail in FIG. 7. The collar 20 has a bent or crimped leading edge 22. As shown in FIG. 2, the edge 22 is embedded in the plastic of the base 10. The crimping produces a rounded entry corner 24 on the collar. The side 26 of the collar is sized to be press fit into a fitment hole, such as a fitment hole in a fuel injector assembly.

The distal end of the collar includes three semicircular shaped extensions which are bent inward and toward the open end of the base 10 to form anchoring tabs 28. The tabs 28 are embedded in the base 10 such that their ends 29 come flush to the back 16 of the base. The tabs 28 and the embedded leading edge 22 provide means for securing the collar 20 to the base 10. As shown in FIG. 6, the ends 29 of the tabs 28 are exposed and cooperate with the back 16 of the base 10 to provide a suitable solid plane for the press fit push of a press fit tool.

As shown in FIG. 4, the base 10 is shaped so that the leading shoulder 12 of the base 10 is smaller in diameter than the entry corner 24 of the collar 20. The rear section 14 of the base extends beyond the collar 20. Rear section 14 is molded to the same diameter as the sides 26 of the collar 20, but due to post molding shrinkage the rear section 14 ends up slightly smaller than the diameter of the sides 26.

As can be seen from FIGS. 2, 3, 4 and 5, the filtration material 32 is molded into the plastic forming the base 10, support ribs 34 and end support 36. The filter is formed by conventional insert molding techniques. The collar 20 and filtration material 32 are held in place while plastic is molded around them to form the complete filter.

FIG. 4 shows the flow paths through the filter once it is press fit into its assembly. Fluid enters through hole 18 in the base 10 and is filtered as it flows through filtration material 32 and continues down stream past the end support 36.

Only two support ribs 34 are used in the preferred embodiment of the invention, though the arrangements of support ribs is not important. The support ribs and filtration material could be formed in a conical, rather than cylindrical shape, or the base itself could support a flat circular piece of filtration material without support ribs.

The base 10, support ribs 34 and end support 36 are nylon 6/12 35% glass filled, though many other suitable materials are well known in the art and can be used. The filtration material used is a woven fabric of polyester monofilaments, capable of retaining 50 micron and larger particles. Other filtration materials may be used, depending on the intended application of the filter.

The collar is made of brass, through other suitable metals are well known in the art and can be used. The preferred embodiment includes three tabs 28, though a fewer or greater number of tabs of suitable shape could also be used. When the tabs 28 are embedded in the base 10, adequate space must be left between the tabs 28 to provide sufficient plastic to connect the rear portion 14 with the remainder of the base 10.

The design of the presently preferred embodiment has numerous advantages. As previously mentioned, the rounded entry corner 24 allows for a smooth metal entry into the fitment hole. The plastic shoulder 12 and the rear portion 14 of base 10 are smaller than the fitment hole so that the entry corner of the fitment hole does not shear off any particles of plastic when the filter is press fit into its assembly.

The filter is of simple construction, yet provides a secure press fit filter that stays in place during temperature changes of the assembly without the need for any other means to hold the filter in place within the assembly. The leading edge 22 and anchoring tabs 28 of the collar 20 are embedded in the plastic of the base 10 and serve to hold the collar 20 onto the base 10, even during temperature changes of the filter.

While the preferred embodiment of the invention has been disclosed, it is understood that the invention is not limited to the disclosed example. Modifications in addition to those discussed can be made without departing from the invention. The scope of the invention is indicated in the appended claims, and all changes that come within the meaning and range of equivalency of the claims are therefore intended to be embraced therein.

I claim:

1. A filter comprising:
   (a) filtration material mounted on a base, and
   (b) means for providing a press fit into a fitment hole including
   a metal collar surrounding at least a portion of said base, a portion of said collar being embedded in said base sufficient for preventing the collar from slipping apart from said base during temperature changes of the filter.

2. The filter of claim 1 wherein the collar is secured to said base at least in part by one or more tabs attached to said collar and embedded within said base.

3. The filter of claim 2 wherein the one or more tabs comprises three tabs.

4. The filter of claim 2 wherein the one or more tabs comprises bent extensions of the distal end of the collar.

5. The filter of claim 4 wherein the ends of the one or more tabs are flush with the back of the base.

6. In a press fit filter of the type having a base supporting filtration material, said base configured to fit within a fitment hole, the improvement comprising:

(a) a metal collar surrounding at least a portion of the base,
(b) said collar having
   (i) a leading edge embedded in the base,
   (ii) a rounded entry corner adjacent to the leading edge to provide a smooth metal surface in contact with an entrance corner and wall of the fitment hole, thereby preventing shearing of particles from the sides of the fitment hole during press fitting of the filter into the fitment hole, and
   (iii) a plurality of tabs at the distal end of the collar embedded in the base sufficient for preventing the collar from slipping apart from said base during temperature changes of the filter.

7. The filter of claim 6 wherein said tabs extend to points flush with the back of the base and provide a suitable surface for the application of force for press fitting the filter in place.

8. The filter of claim 6 wherein the base is made of plastic, and the tabs are embedded in the base by injection molding.

9. The filter of claim 6 wherein the base includes a leading shoulder smaller than the diameter of the collar.

10. The filter of claim 6 wherein a rear portion of the base extends beyond the collar and said rear portion has a diameter smaller than that of the collar.

11. A press fit fuel injector filter comprising:
   (a) a plastic base configured to fit within a fitment hole in a metal assembly, said base including a fluid inlet hole,
   (b) filtration material supported by the base,
   (c) a metal collar surrounding at least a portion of the base, said collar comprising:
      (i) a front edge embedded in the plastic base,
      (ii) a rounded entry corner adjacent to said front edge to provide a smooth metal surface in contact with an entrance corner and wall of the fitment hole, sufficient for preventing shearing of particles from the sides of the fitment hole during press fitting of the filter into the fitment hole, and
      (iii) a plurality of anchoring tabs embedded in the plastic base at its distal end sufficient for preventing the collar from slipping apart from said base during temperature changes of the filter.

12. The filter of claim 11 further comprising rib support structure attached to the base and supporting the filtration material.

13. The filter of claim 12 wherein the rib suport structure includes an end wall.

14. The filter of claim 13 wherein the rib support structure and filtration material form a cylindrical shaped filter surface.

15. The filter of claim 11 wherein the filtration material comprises a fabric of polyester monofilaments.

16. The filter of claim 15 wherein the filtration material retains particles of 50 micron size or larger.

* * * * *

UNITED STATES PATENT AND TRADEMARK OFFICE
CERTIFICATE OF CORRECTION

PATENT NO. : 4,608,166

DATED : Aug. 26, 1986

INVENTOR(S) : Thomas A. Cain

It is certified that error appears in the above-identified patent and that said Letters Patent is hereby corrected as shown below:

IN THE DETAILED DESCRIPTION OF THE
PREFERRED EMBODIMENTS OF THE INVENTION

In Column 3, line 3, please delete "through" and substitute therefor --though--.

IN THE CLAIMS

In Claim 4 (column 3, line 52), please delete "comprises" and substitute therefor --comprise--;

In Claim 6 (column 4, line 8), please delete "thereby preventing" and substitute therefor --sufficient for preventing--;

In Claim 13 (column 4, line 48), please delete "suport" and substitute therefor --support--.

Signed and Sealed this

Seventeenth Day of May, 1988

Attest:

DONALD J. QUIGG

*Attesting Officer*  *Commissioner of Patents and Trademarks*